(12) United States Patent
Kierat

(10) Patent No.: US 9,488,133 B2
(45) Date of Patent: Nov. 8, 2016

(54) EXHAUST-GAS TURBOCHARGER

(75) Inventor: Jaroslaw Kierat, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 645 days.

(21) Appl. No.: 13/885,480

(22) PCT Filed: Nov. 18, 2011

(86) PCT No.: PCT/US2011/061310
§ 371 (c)(1),
(2), (4) Date: Jul. 22, 2013

(87) PCT Pub. No.: WO2012/071254
PCT Pub. Date: May 31, 2012

(65) Prior Publication Data
US 2013/0323041 A1 Dec. 5, 2013

(30) Foreign Application Priority Data
Nov. 24, 2010 (DE) .................. 10 2010 052 373

(51) Int. Cl.
 *F03B 1/04* (2006.01)
 *F02M 25/07* (2006.01)
 *F02B 37/22* (2006.01)
 *F01D 17/14* (2006.01)
(52) U.S. Cl.
 CPC ............ *F02M 25/07* (2013.01); *F01D 17/143* (2013.01); *F02B 37/22* (2013.01); *F02M 26/00* (2016.02); *F05D 2220/40* (2013.01); *Y02T 10/144* (2013.01)

(58) Field of Classification Search
 CPC ...... F01D 17/143; F01D 17/00; F01D 17/10; F01D 17/12; F01D 17/14; F01D 17/141; F01D 17/146; F05D 2220/40; F02B 37/22; F02M 25/07; Y02T 10/144
 USPC .......................... 415/157, 158, 155, 159, 165
 See application file for complete search history.

(56) References Cited

U.S. PATENT DOCUMENTS

| | | | | | |
|---|---|---|---|---|---|
| 4,776,168 A | * | 10/1988 | Woollenweber | ...... | F01D 17/141 60/602 |
| 4,984,965 A | * | 1/1991 | McKean | ............... | F01D 17/143 415/155 |
| 6,715,288 B1 | * | 4/2004 | Engels | .................. | F01D 17/143 415/158 |
| 2003/0123977 A1 | * | 7/2003 | Bertnik | ..................... | F01D 5/28 415/158 |

\* cited by examiner

*Primary Examiner* — Eric Keasel
*Assistant Examiner* — Jason Mikus
(74) *Attorney, Agent, or Firm* — A. Michael Tucker; Stephan A. Pendorf; Patent Central LLC

(57) ABSTRACT

An exhaust-gas turbocharger (1) having a compressor (2); a turbine (5) which has a turbine wheel (6) with a radial flow region (11) and a semi-axial flow region (12) and which has a turbine housing (7) which has a spiral arrangement (9), surrounding the turbine wheel (6) at its outer circumference (8), for supplied exhaust gas; and a guide grate (10) for supplying exhaust gas to the turbine wheel (6). The guide grate (10) has a guide ring (13), which is axially movable in the charger axial direction (L) and is assigned to the radial flow region (11), and a closure sleeve (14), which is axially movable in the charger axial direction (L) and which is assigned to the semi-axial flow region (12).

6 Claims, 2 Drawing Sheets

EXHAUST-GAS TURBOCHARGER

Figure 1:
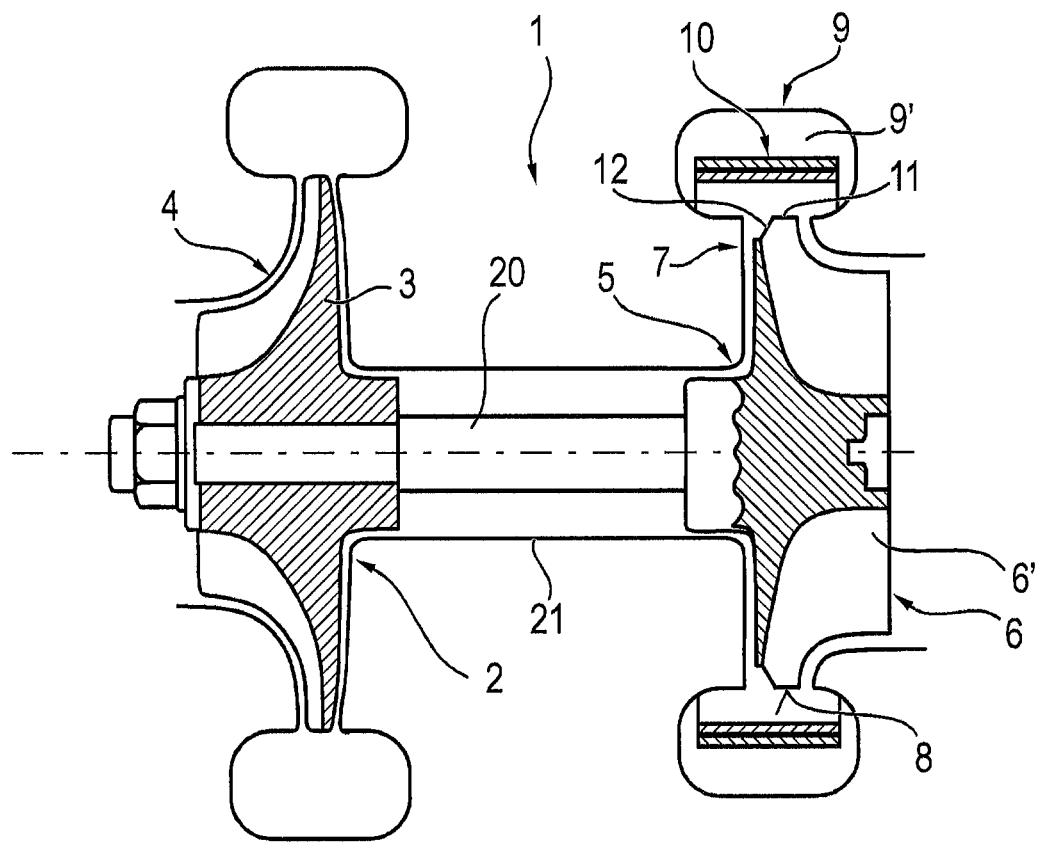

The invention relates to an exhaust-gas turbocharger as per the preamble of claim 1.

An exhaust-gas turbocharger of said type is known from U.S. Pat. No. 4,653,275. Said charger has a turbine with a radial turbine wheel which is arranged in a turbine housing with two spiral-shaped gas ducts. The radial turbine wheel has a radial flow region and a semi-axial flow region. In a low rotational speed range of an internal combustion engine, a control element of a guide grate is actuated such that the blades of the radial turbine wheel are acted on approximately axially by one of the spiral-shaped gas ducts.

If the rotational speed of the radial turbine wheel exceeds a predefined rotational speed, the duct which has previously acted approximately axially on the radial turbine wheel is closed and the other spiral-shaped gas duct is actuated by the guide grate, such that exhaust gases can be supplied radially to the blades of the radial turbine in a known way.

The known exhaust-gas turbocharger consequently has a turbine housing with two spiral-shaped gas ducts to which is assigned in each case one separately actuable control element of the guide grate, such that either one gas duct acts approximately axially on the radial turbine wheel or the other gas duct supplies exhaust gas in the radial direction to the blades of the radial turbine wheel.

It is an object of the present invention to provide an exhaust-gas turbocharger of the type specified in the preamble of claim 1, the efficiency of which is further increased in relation to the known turbocharger.

Said object is achieved by means of the features of claim 1.

As a result of the provision of an axially movable guide ring which is assigned to the radial flow region of the turbine wheel, it is possible, at low rotational speeds of the engine provided with the exhaust-gas turbocharger according to the invention, for only the radial flow region of the turbine wheel to be acted on with an exhaust-gas flow, whereas the closure sleeve covers the semi-axial flow region of the turbine wheel. This improves the response behavior of the turbocharger at low rotational speeds.

In contrast, at high rotational speeds, the semi-axial flow region is opened up by the closure sleeve and the guide ring is retracted, such that both the radial flow region and also the semi-axial flow region can be impinged on by a flow of exhaust gas at said high rotational speeds of the engine, which yields lower flow resistances and therefore an increase in efficiency of the exhaust-gas turbocharger.

Since the guide grate is provided with two components, which can be moved axially independently of one another, in the form of the guide ring and the closure sleeve, there is also a resulting simplification of the design in relation to known guide grates which are provided with pivotable components.

Known control devices (for example control capsule or electric actuator) may be used for actuating the guide grate of the exhaust-gas turbocharger, wherein for example the rotational speed of the turbine wheel or of the rotor shaft or else the charge pressure in the intake system of the internal combustion engine may be used as control variables.

The subclaims relate to advantageous refinements of the invention.

Figure 2:
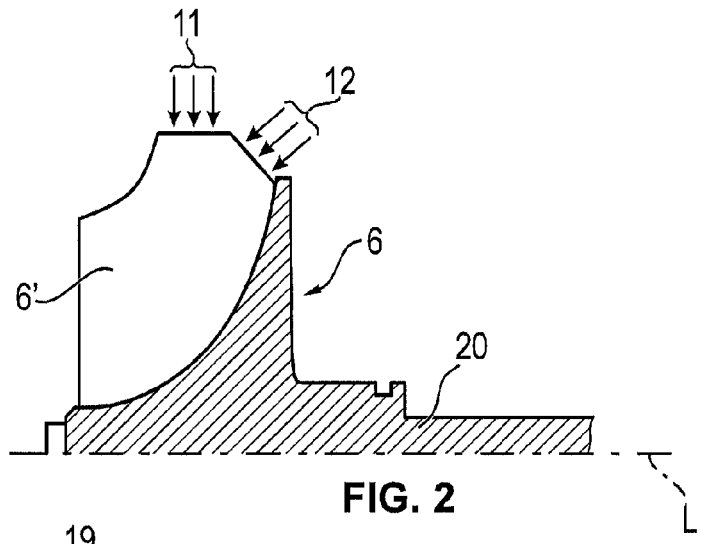
Figure 3:
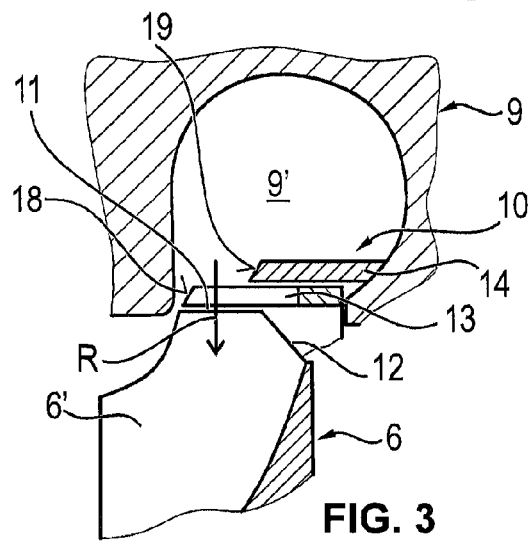
Figure 4:
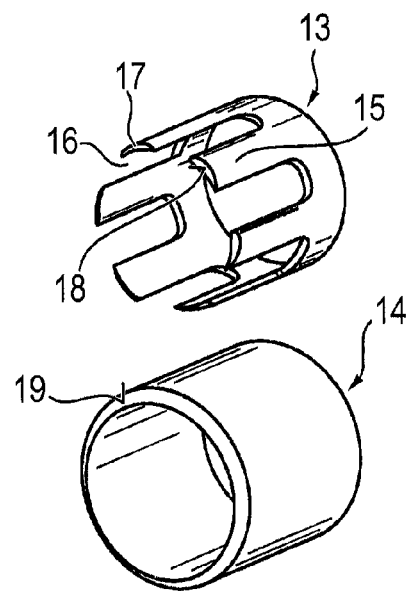
Figure 5:
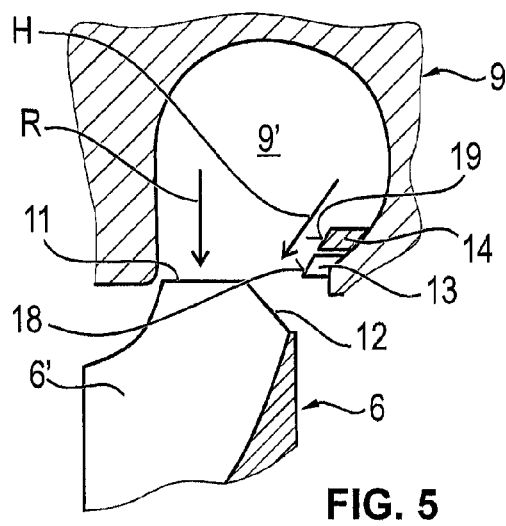

Further details, advantages and features of the present invention will emerge from the following description of exemplary embodiments on the basis of the appended drawing, in which:

FIG. 1 shows a schematically highly simplified diagrammatic illustration of the exhaust-gas turbocharger according to the invention, FIG. 2 shows a schematically highly simplified illustration of the turbine wheel of the exhaust-gas turbocharger according to the invention, FIG. 3 shows a schematically highly simplified illustration of the position of the guide grate of the exhaust-gas turbocharger according to the invention at low engine rotational speeds, FIG. 4 shows schematically simplified perspective illustrations of a guide ring and a closure sleeve of the guide grate of the exhaust-gas turbocharger, and FIG. 5 shows an illustration corresponding to FIG. 3 of a part of the exhaust-gas turbocharger according to the invention for explaining the position of the guide grate at high engine rotational speeds.

FIG. 1 shows in schematically highly simplified form an exhaust-gas turbocharger 1 which has a compressor 2 with a compressor wheel 3 in a compressor housing 4. The compressor wheel 3 is connected via a rotor shaft 20 to a turbine wheel 6 of a turbine 5. The turbine wheel 6 has a radial flow region 11 and a semi-axial flow region 12 and is arranged in a turbine housing 7 which comprises a spiral arrangement 9. In the example illustrated, the spiral arrangement 9 is a single spiral-shaped gas duct 9' which is arranged in an encircling manner around the turbine wheel 6.

A guide grate 10 for supplying exhaust gas to the turbine wheel 6 is arranged in the spiral arrangement 9 or the gas duct 9'. The design and the function of said guide grate 10 will be explained in detail below on the basis of FIGS. 3 to 5.

The exhaust-gas turbocharger 1 otherwise self-evidently has all the other conventional components, in particular a control and regulating device for the guide grate 10 for the actuation of the latter, which is however not illustrated in detail in the figures because it is not necessary for explaining the principles of the present invention.

FIG. 2 depicts a half of the turbine wheel 6 in a schematically simplified illustration. The turbine wheel 6 has, as is conventional, a multiplicity of wheel blades, of which the wheel blade 6' is illustrated in FIG. 2. Each of the wheel blades 6' has, according to the principles of the present invention, a radial flow region 11 and, adjoining the latter, a semi-axial flow region 12. Said regions are indicated in FIG. 2 by in each case three arrows, which simultaneously indicate the flow direction from which the exhaust gas is supplied to the turbine wheel 6 or the wheel blades 6' thereof. It is clear from this that the radial flow region 11 is approached by flow in the radial direction, wherein the radial direction is aligned at least substantially perpendicular to the charger longitudinal axis L.

A semi-axial approach flow symbolized by the arrows 12 is a direction which yields an axial flow component, as is shown in detail in the illustration of FIG. 2.

FIG. 3 again illustrates the upper part of the turbine wheel 6 with its wheel blade 6', wherein the spiral arrangement 9 surrounding the turbine wheel 6 is also illustrated in schematically simplified form. In the embodiment illustrated, the spiral arrangement 9 has, as stated, only one spiral-shaped gas duct 9'.

A guide grate 10 for supplying exhaust gas to the turbine wheel 6 or to the wheel blades 6' thereof is arranged in the turbine housing 7 (not illustrated in detail in FIG. 3). According to the invention, said guide grate 10 has a guide ring 13 which is shown in a perspective illustration in FIG. 4 and which is the upper of the two components 13 and 14 illustrated therein.

The guide ring 13 is guided in an axially movable manner, parallel to the charger axis L, in the turbine housing 7 and can be moved into the position illustrated in FIG. 3. In said position, the guide ring 13 permits a radial inflow of exhaust gas to the turbine wheel 6, as symbolized by the arrow R. The second component illustrated in FIGS. 3 and 4 is a closure sleeve 14 which, in FIG. 3, is arranged in a position in which it covers the semi-axial flow region 12, such that only the approach flow to the turbine wheel 6 symbolized by the arrow R is possible. Said position of the guide grate 10 is assumed at low rotational speeds of the engine with which the exhaust-gas turbocharger 1 according to the invention is provided.

As can be seen from FIG. 4, the axially movable guide ring 13 is provided with a multiplicity of guide blades 15, one of which is denoted, representatively of all, by said reference numeral 15 in FIG. 4. Provided between the guide blades 15 are flow slots 16 which permit the above-described radial approach flow symbolized in FIG. 3 by the arrow R.

For this purpose, the guide blades 15 preferably have a streamlined profile 17 and the sum of the end surfaces thereof forms an end-side flow guiding surface 18. In contrast, the closure sleeve 14 is a closed shut-off element of substantially cylindrical design, which in its closed position illustrated in FIG. 3 does not permit an approach flow to the semi-axial flow region 12 of the turbine wheel 6. The closure sleeve 14 likewise has an end-side flow guiding surface 19.

FIG. 5 again illustrates the turbine wheel 6 with one of its turbine wheel blades 6' and the spiral arrangement 9 with its, in this case single, spiral-shaped gas duct 9'. The position assumed here by the guide ring 13 and the closure sleeve 14 is a position assumed at high engine rotational speeds. FIG. 5 shows here that the guide ring 13 and the closure sleeve 14 are retracted into the turbine housing (also not illustrated in detail in FIG. 5), such that in said position the semi-axial flow region 12 of the turbine wheel 6 is also opened up, such that both a radial approach flow, symbolized by the arrow R, and also a semi-axial flow, symbolized by the arrow H in FIG. 5, are permitted. Here, flow guidance in the direction of the semi-axial flow region 12 is realized by means of the end-side flow guiding surfaces 18 and 19.

As already mentioned in the introduction, a control/regulating device for actuating the guide grate 10 is not illustrated in detail in the figures but is self-evidently provided, wherein use may be made of known devices which can take into consideration for example the rotational speed of the turbine wheel or also the pressure in the intake tract of the engine as control variables.

It is also possible for the spiral arrangement 9 to be provided with two spiral-shaped gas ducts arranged adjacent to one another. The arrangement of the guide grate 10 is not influenced by this, and it must merely be ensured that the closure sleeve 14 covers and opens up only the duct assigned to the semi-axial flow region 12 of the turbine wheel 6.

Aside from the written disclosure of the invention above, reference is hereby additionally explicitly made to the diagrammatic illustration in FIGS. 1 to 5.

LIST OF REFERENCE SYMBOLS

1 Exhaust-gas turbocharger
2 Compressor
3 Compressor wheel
4 Compressor housing
5 Turbine
6 Turbine wheel
6' Wheel blades
7 Turbine housing
8 Outer circumference
9 Spiral arrangement
9' Spiral-shaped gas duct
10 Guide grate
11 Radial flow region
12 Semi-axial flow region
13 Guide ring
14 Closure sleeve
15 Guide blades
16 Flow slots
17 Streamlined profile
18 Flow guiding surface
19 Flow guiding surface
20 Rotor shaft
21 Bearing housing
R Radial flow of the exhaust gas
H Semi-axial flow of the exhaust gas

The invention claimed is:

1. An exhaust-gas turbocharger (1) comprising:
a compressor (2);
a turbine (5) having a turbine wheel (6) and a turbine housing with a spiral arrangement (9) surrounding the turbine wheel (6) at its circumference and designed to deliver exhaust-gas flow to the turbine wheel over a radial flow region (11) and a semi-axial flow region (12); and
a guide grate (10) for selectively influencing the supply of exhaust gas to the turbine wheel (6), wherein the guide grate (10) has
 a guide ring (13) having a multiplicity of guide blades (15) which delimit flow slots (16), which is axially movable in the charger axial direction (L) and can be positioned in the radial flow region (11), and
 a closure sleeve (14) of substantially cylindrical design, which in its closed position blocks flow to the semi-axial flow region (12), which is axially movable in the charger axial direction (L) and into and out of the semi-axial flow region,
wherein said guide grate (10) can be configured into at least:
 a high-flow configuration with the guide ring (13) and the closure sleeve (14) retracted into the turbine housing such that the radial flow region (11) and the semi-axial flow region (12) of the turbine wheel (6) are opened,
 a low-flow configuration with the guide ring (13) covering the semi-axial flow region (12) of the turbine wheel (6) and the closure sleeve (14) covering and blocking flow to the semi-axial flow region (11).

2. The exhaust-gas turbocharger as claimed in claim 1, wherein the guide blades (15) have a streamlined profile (17).

3. The exhaust-gas turbocharger as claimed in claim 1, wherein the guide ring (13) has an end-side flow guiding surface (18).

4. The exhaust-gas turbocharger as claimed in claim 1, wherein the closure sleeve (14) has an end-side flow guiding surface (19).

5. The exhaust-gas turbocharger as claimed in claim 1, wherein the spiral arrangement (9) has a spiral-shaped gas duct (9').

6. The exhaust-gas turbocharger as claimed in claim 1, wherein the turbocharger includes a controller, which senses engine rotational speed, and directs the closure sleeve (14) of the guide grate (10) to be positioned in the semi-axial flow region, blocking semi-axial flow to the turbine wheel (6), at a lower engine rotational speed, and to be retracted from the semi-axial flow region, allowing radial and semi-axial flow onto the turbine wheel (6), at a higher engine rotational speed.

\* \* \* \* \*